Figure 1:
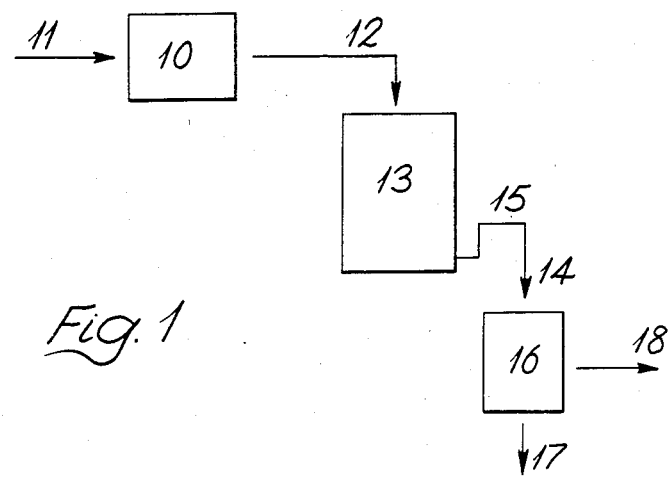

United States Patent [19]

Foster

[11] Patent Number: 4,638,048

[45] Date of Patent: Jan. 20, 1987

[54] METHOD OF EXTRACTING CRYOPRECIPITATE FROM FROZEN BLOOD PLASMA

[75] Inventor: Peter R. Foster, Edinburgh, Scotland

[73] Assignee: National Research Development Corporation, London, England

[21] Appl. No.: 828,608

[22] Filed: Feb. 12, 1986

Related U.S. Application Data

[63] Continuation of Ser. No. 691,736, Jan. 16, 1985, abandoned, which is a continuation of Ser. No. 558,558, Dec. 5, 1983, abandoned, which is a continuation of Ser. No. 362,517, Mar. 26, 1982, abandoned.

[30] Foreign Application Priority Data

Apr. 2, 1981 [GB] United Kingdom ................. 8110354

[51] Int. Cl.⁴ .................. A23J 1/06; B01D 17/00; C07K 3/26
[52] U.S. Cl. ..................................... 530/380; 62/124; 62/532; 210/179; 210/774; 210/927; 210/737; 422/44; 424/101; 530/383; 530/830
[58] Field of Search .................. 62/124, 532; 210/737, 210/774, 775, 177, 178, 179, 927; 530/380, 383, 830; 422/44, 225; 424/101

[56] References Cited

U.S. PATENT DOCUMENTS

| | | | |
|---|---|---|---|
| Re. 27,359 | 5/1972 | Ilg | 210/774 |
| 2,617,273 | 11/1952 | Findlay | 210/774 |
| 2,823,242 | 2/1958 | McKay | 210/774 |
| 2,910,516 | 10/1959 | Rush | 210/774 |
| 3,289,838 | 12/1966 | Garrett | 210/179 |
| 3,527,572 | 9/1970 | Urkiewicz | 210/927 |
| 4,066,549 | 1/1978 | Oeser | 210/177 |
| 4,067,863 | 1/1978 | Watt | 530/380 |
| 4,141,887 | 2/1979 | Seufert | 530/380 |
| 4,170,590 | 10/1979 | Stephan | 530/380 |
| 4,379,083 | 4/1983 | Falke | 530/380 |

OTHER PUBLICATIONS

"Thaw-Siphon Technique for Production of Cryoprecipitate Concentrate Factor VIII", by E. C. Mason, Lacet, Jul. 1, 1978, pp. 15-17.
Comment on "Thaw-Siphon Technique", by Foster and White, Lancet, Sep. 9, 1978, p. 574.
"Evaluation of the 'Mason', (Continuous-Thaw-Siphon), Method for Cryoprecipitate Production", by Prowse and McGill, vox Sanguinis, 37:235-243 (1979).
"Large Scale Plasma Thawing for Factor VIII Recovery", by Foster, Hunter, Dickson and White, Thrombosis Haemostasis 42, 64 (1979).

*Primary Examiner*—Ernest G. Therkorn
*Attorney, Agent, or Firm*—Cushman, Darby & Cushman

[57] ABSTRACT

Cryoprecipitate for the production of factor VIII is extracted from frozen blood plasma by continuously circulating the plasma in a crushed state between the peripheral and central regions of an externally, steadily heated thawing zone, with thawed mixture of liquor and cryoprecipitate being removed from the lowermost region of the zone by way of a path including a weir configuration. Preferably: the zone is formed by an axially upright cylindrical vessel; circulation is effected by at least one helical blade coaxially rotatable in the vessel, which blade extends over the vessel heights, is radially narrow compared to the vessel, is close to the vessel wall, and scoops material upwardly; the outlet from the vessel is tangentially opposed to the blade rotation; and heating is by way of a liquid jacket with generally axial flow therethrough.

5 Claims, 3 Drawing Figures

METHOD OF EXTRACTING CRYOPRECIPITATE FROM FROZEN BLOOD PLASMA

This is a continuation of application Ser. No. 691,736, filed Jan. 16, 1985, which was a continuation of application Ser. No. 558,558, filed Dec. 5, 1983, which was a continuation of application Ser. No. 362,517, filed Mar. 26, 1982, all now abandoned.

This invention concerns a blood plasma treatment method apparatus therefore, and more particularly centres on such treatment for the extraction of so-called cryoprecipitate.

Cryoprecipitate is a proteinaceous solid-phase constituent which forms when frozen plasma is thawed, and is rich in a blood clotting factor, commonly known as factor VIII, widely used in haemostasis therapy for haemophiliacs.

Extraction of cryoprecipitate is conventionally effected by batch processing of plasma from individual blood donations and is subject to several difficulties. A first difficulty is that the batch processing inherently entails low productivity or a requirement for extensive duplication of processing equipment because an individual donation provides a plasma volume only of the order of 200 ml. Other difficulties arise from loss of factor VIII activity in the cryoprecipitate when the frozen plasma is thawed.

These last difficulties arise more specifically from two causes, namely:
 (a) The factor VIII molecule is easily damaged by the physical changes taking place and by enzymic degradation.
 (b) The solubility of the cryoprecipitate is temperature dependent within a small range of temperature, with factor VIII going back into solution at 3° to 4° C.

In the current production of factor VIII the more common procedure is to attempt to minimise difficulty (b) by thawing the plasma slowly at a controlled temperature, to the extent, for example, of leaving the plasma overnight at a temperature of 4° C. This clearly aggravates difficulty (a) by virtue of the long period in which degradation can occur. An alternative, more recent procedure ("Thaw-Siphon Technique for Production of Cryoprecipitate Concentrate of Factor VIII", E.C. Mason, Lancet, July 1st, 1978) is to minimise difficulty (a) by accelerated thawing while attempting in respect of difficulty (b) to maintain temperature control. This alternative procedure involves thawing of plasma in frozen slab form and can give a good yield from a 200 ml slab. However, the temperature control is less effective in larger scale thawing because a marked temperature gradient is likely to occur across the surrounding thawed liquid phase with a degree of resultant cryoprecipitate dissolution and, therefore, low yield.

An object of the present invention is to provide an improved procedure, and associated apparatus for cryoprecipitate extraction.

To this end one aspect of the present invention provides a method of extracting cryoprecipitate from frozen blood plasma which comprises continuously motivating the plasma in a crushed state to circulate between the peripheral and central regions of a thawing zone, while steadily heating the exterior of said zone, and removing thawed mixture of liquor and cryoprecipitate from the lowermost region of said zone along a path leading upwardly from said zone and then downwardly.

Preferably the removal path leaves the thawing zone initially in a direction substantially tangential thereto and the crushed plasma circulation adjacent to this path is in a generally opposite direction thereto.

The circulation of this method is preferably upwardly in the circumferential pheripheral region, downwardly in the central axial region, and radially between these regions, in a thawing zone substantially in the form of an axially upright body of revolution, conveniently circular cylindrical. The associated heating suitably comprises flowing a heated liquid over said peripheral region in a generally axial direction in counterflow or concurrent manner with the peripheral plasma motion.

Use of the invention is beneficial from several points of view. The frozen plasma is in a crushed state, preferably of fine form referred to as "snow", which allows circulation and mixing while presenting a large surface area for heat exchange purposes. The circulation passes the snow over the periphery of the zone where it is progressively thawed, while also returning remanent snow and resultant cryoprecipitate and thawed liquor through the centre of the zone, to produce in the result overall intermixing of plasma, cryoprecipitate and liquor with an overriding tendency for the latter two components to accumulate in the lower region. This accumulation gives rise to gravitational outflow which can be made up by input of further crushed plasma, so that one benefit is continuity of processing with the possibility of large volume output. Moreover, in continuous processing the overall intermixing produces a steady state situation, the thermal stability of which is controllable by way of the circulation rate and the temperature and flow rate of the liquid through the jacket to maintain the cryoprecipitate at no more than 4° C., and in practice about 0°–1° C., thereby avoiding dissolution. In addition, the circulation and steady outflow provides that cryoprecipitate does not remain in the thawing zone sufficiently long to allow undue degradation, the cryoprecipitate and liquor being readily separable, such as by centrifuging, upon outflow, so that the eventual factor VIII yield can be high.

The overall result of these benefits is that a high yield can be obtained independently of the scale of operation.

In a related aspect the invention also provides apparatus for carrying out the above method, such apparatus comprising: a vessel shaped as an axially upright hollow body of revolution defining said thawing zone; a stirrer including at least one helical blade coaxially rotatable within said body, each said blade extending over a major proportion of the height of said vessel, being radially small relative to said vessel, located closely adjacent the inner circumferential periphery of said vessel, and being rotatable in a sense to scoop material in said vessel upwardly; heating means around the circumferential periphery of said vessel; and an outlet duct leading tangentially from the lowermost portion of said surface in opposition to the adjacent blade rotation path and including a weir configuration rising above the bottom of said zone.

The vessel is preferably circular cylindrical with an upwardly domed base and will normally have greater height than diameter, suitably in a ratio in the range 2:1 to 3:1, while the weir rises to a significant, but minor, proportion of the body height, suitably to the order of one third of the height.

Each stirrer blade will normally be arranged with its width extending substantially radially of the vessel, this width suitably being in a proportion of about 0.1 of the vessel radius. Also there are preferably two blades of diametrially duplicate form.

The heating means is preferably of liquid-containing jacket form with upper and lower ports to allow generally axial flow through the jacket, this flow being upwardly at present, but possibly alternatively downwardly.

Figure 3:
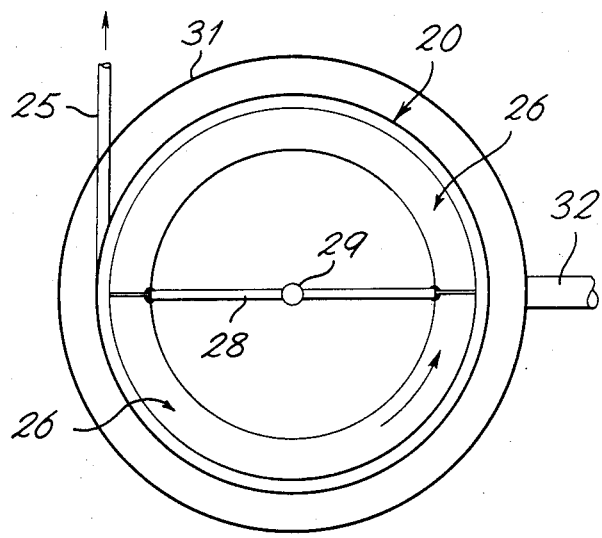
Figure 2:
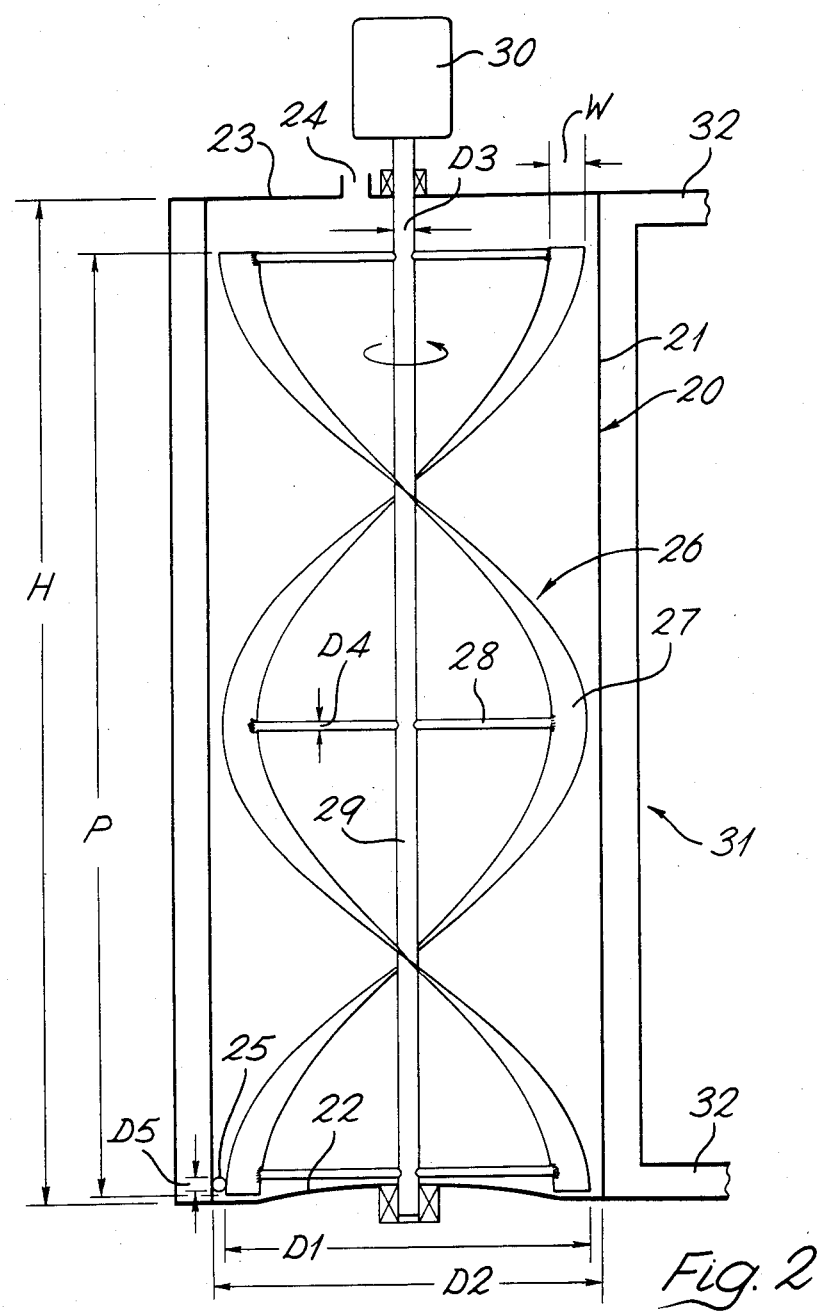

In order that the above more generally discussed aspects and preferred features may be more fully understood, the invention will now be further described, by way of example, with reference to the accompanying drawings, in which:

FIG. 1 illustrates in flow diagram form an overall plasma treatment arrangement according to the invention; and FIGS. 2 and 3 diagrammatically illustrate respectively in longitudinal and cross sectional views one embodiment of part of the apparatus in the arrangement of FIG. 1.

The arrangement of FIG. 1 comprises three main operational states, namely, a crusher 10 to convert an input 11 of frozen plasma in block form at about −10° C. to a finely divided snow output 12. The snow is fed to a thawing stage 13 which is central to the present invention and wherein thawing is effected to produce an output mixture 14 of cryoprecipitate and liquor at a temperature of not more than substantially 4° C. passing through a weir configuration 15. This mixture is thereafter fed to a separator 16 providing divided outputs of cryoprecipitate 17 and liquor 18. In practice the flow from the weir conveniently passes to a break vessel from which further conveyance is by pumping to the separator.

The crusher can be of any suitable form, that used so far in development of the invention involving a hopper inlet to one end of a transverse duct in which a worm of progressively increasing pitch therealong rotates with a small radial clearance. The snow output has, as yet, been fed directly from the crusher into the thawing station, with the rate of addition being controlled by an operator to maintain a sensibly constant height in the latter, but some form of automatic control is contemplated as a clearly practicable and possibly desirable option in a production facility as distinct from the present development/pilot arrangement.

Turning to the form of the thawing station, FIGS. 2 and 3 illustrate that used in a pilot arrangement during development of the invention.

This station comprises a vessel 20 having an upright circular cylindrical side wall 21, an upwardly domed base end 22, and an upper end 23. The upper end has an inlet port facility 24 for entry of snow, and the side wall has an outlet duct 25 extending tangentially from its lowermost portion in a radial transverse plane thereof.

A stirrer 26 is mounted in the vessel 20, this stirrer including two like, diametrally opposed, helical blades 27 supported in close proximity to the side wall by way of arms 28 extending radially from an axial shaft 29. The blades are of narrow strip form having small width compared to the vessel radius, they extend over substantially the whole internal height of the vessel and in close proximity to the base thereof, they have a pitch such as to turn through one revolution over their length, and they are disposed with their width substantially radially of the vessel at any point therealong. The shaft 29 is rotatable by a motor 30 including any appropriate gearing and is suitably journalled in the upper and base ends of the vessel for this purpose. It is to be noted that the shaft rotation is such as to drive the blades to 'scoop' fluent contents of the vessel upwardly across the inner surface of the latter and so produce for these contents a resultant circulatory motion with return down the axial region of the vessel and appropriate linking radial flow paths. Also, it is to be noted that the blade motion passes closely adjacent the mouth to the outlet duct 25 in a direction opposite to that of the duct.

A remaining feature of the thawing station is the provision of a water jacket 31 around the side wall of the vessel, this jacket having upper and lower ports 32 for inlet and outlet of water therethrough in a generally axial flow. This water flow is passed externally of the vessel through a heater and pump (both not shown) to circulate heated water upwardly through the jacket.

The general operation of this station is largely evident from the foregoing description in terms of the circulation, thawing, and intermixing of snow, cryoprecipitate and liquor, with the latter two components accumulating in the lower portion of the vessel to provide a gravitational outflow through the weir 15 (FIG. 1).

Points of further interest include the relatively opposed directions of blade movement and tangential outlet duct, with the latter also being small relative to the vessel, so that snow does not readily block the outlet or, indeed, pass in any significant quantity through the outlet before thawing. The water flow rate and input temperature for the jacket is controlled to attain the thermal stability in the vessel referred to earlier, and this control can be effected automatically by way of the heater and pump in response to suitably located temperature detectors. A further operational parameter related to this stability is the rate of rotation of the stirrer. Other factors which affect this stability, but which are fixed in a given design of apparatus, involve the geometry of the blade, and of the vessel, insofar as these affect the mixing and therefore the temperature gradients within the vessel. The height of the weir is also relevant in determining the height of accumulated cryoprecipitate and liquor. Generally speaking such a plurality of interdependent parameters and factors affecting a desired result can have many combinations of values for practicable operation, and are commonly varied to establish optimum ranges of value. Such ranges have been assessed in the development of the invention to date and are reflected by values and ranges indicated in the foregoing discussion. However, for further guidance the following specific data are given for an initial pilot facility and also for an enlarged facility which has been developed subsequently.

| Dimension (cms) | | Pilot | Enlarged |
| --- | --- | --- | --- |
| D1 | (Stirrer diameter) | 23.5 | 29.0 |
| D2 | (Vessel diameter) | 24.5 | 30.0 |
| P | (Blade pitch) | 36.7 | 75.0 |
| W | (Blade width) | 2.3 | 2.8 |
| H | (Vessel height) | 42.0 | 80.0 |
| D3 | (Shaft diameter) | 2.1 | 1.6 |
| D4 | (Arm diameter) | 0.9 | 0.6 |
| D5 | (Outlet diameter) | 0.9 | 1.2 |

In the pilot, stirrer rotation is optimally about 55 rpm, water jacket temperature and flow rate are similarly about 15° C. and 60 l/min, and an overall throughput of about 100 l/hr has been achieved with cryoprecipitate factor VIII recovery of about 500 international units per liter (IU/l) of plasma. This recovered cryoprecipitate is suitable for further processing to intermediate or high purity concentrate giving a final factor VIII recovery of 250-300 IU/l, compared with about 200 IU/l achieved with the prior art extraction procedures with throughputs of at least one lesser order. The enlarged, full-scale production version is found to give yet better mixing, enabling a higher water jacket temperature and flow rate of about 20° C. and 130 l/min to be used with stirrer rotation of 55 rpm and a throughput of about 200 l/hr with sustained recovery.

It should also be mentioned that frozen plasma blocks are commonly stored at about −40° C., but it has been found beneficial to warm the blocks for a few hours at 4° C. to bring them to a temperature of −15° to −10° C. prior to crushing. This results in the production of smaller particles, of about 0.2 cm median diameter, increased surface area for the snow, and enhanced heat exchange.

As a concluding point, it is reiterated that the more detailed discussion above in relation to the drawings is given by way of example, and the invention is not intended to be limited thereby, but can be varied within the broader terms of the initial discussion thereof. In particular, the discussion has centred on cryoprecipitate extraction for the production of factor VIII, but the invention may also be applied to the thawing of plasma for the recovery of other fractions. The invention may also be used for processing other frozen biological materials, such as cellular extracts, or non-biological materials where controlled thawing is desired.

I claim:

1. A method of extracting cryoprecipitate from frozen blood plasma, which comprises:

crushing the frozen plasma obtained from a multiplicity of individual blood donations;

conveying the crushed plasma to a bulk thawing zone;

continuously circulating the crushed plasma in said zone to rotate around an upright axis and, at the same time, to move respectively upwardly and downwardly in the circumferentially peripheral and axially central regions of said zones, and radially between these zone regions;

steadily heating the exterior of said zone during said circulation to thaw said crushed plasma to produce liquor and cryoprecipitate in mixture with the remainder of said crushed plasma;

progressively removing, as it is formed, said liquor and cryoprecipitate from the lowermost region of said zone by way of a path which extends therefrom initially in an opposite direction to that of said rotation, and also upwardly and then downwardly;

and mutually separating said removed liquor and cryoprecipitate.

2. A method according to claim 1 wherein said heating comprises flowing a heated liquor over said peripheral region in an axial direction of said zone.

3. A method according to claim 1 which comprises slowly bringing said frozen plasma from a lower temperature to a temperature in the range −15° to −10° C. and then crushing the same.

4. A method according to claim 1 of continuous form in which crushed plasma is progressively added to said zone to replace said liquor and cryoprecipitate removed therefrom, and in which said circulation and heating are controlled to provide a steady state with cryoprecipitate in said mixture maintained at a temperature of no more than 4° C.

5. A method according to claim 4 wherein said maintained temperature is about 0°-1° C.

* * * * *